(12) United States Patent
Selker et al.

(10) Patent No.: US 6,188,390 B1
(45) Date of Patent: Feb. 13, 2001

(54) KEYBOARD HAVING THIRD BUTTON FOR MULTIMODE OPERATION

(75) Inventors: Edwin Joseph Selker, Palo Alto; Barton Allen Smith, Campbell; Shumin Zhai, San Jose, all of CA (US)

(73) Assignee: International Business Machines Corp., Armonk, NY (US)

( * ) Notice: Under 35 U.S.C. 154(b), the term of this patent shall be extended for 0 days.

(21) Appl. No.: 09/083,639

(22) Filed: May 22, 1998

(51) Int. Cl.[7] .................................................. G09G 5/00
(52) U.S. Cl. .......................... 345/168; 345/172; 341/20; 341/21
(58) Field of Search .................................. 345/161, 163, 345/164, 167, 168, 156, 157, 172, 173; 341/20, 21, 22, 23

(56) References Cited

U.S. PATENT DOCUMENTS

| | | | |
|---|---|---|---|
| 5,339,097 | * 8/1994 | Grant | 345/168 |
| 5,360,280 | * 11/1994 | Camacho et al. | 400/489 |
| 5,398,044 | * 3/1995 | Hill | 345/145 |
| 5,416,498 | * 5/1995 | Grant | 345/168 |
| 5,805,139 | * 9/1998 | Uehara | 345/156 |
| 5,914,702 | * 6/1999 | Derocher et al. | 345/157 |
| 5,956,017 | * 9/1999 | Ishizawa et al. | 345/156 |

* cited by examiner

Primary Examiner—Vijay Shankar
Assistant Examiner—Mansour M. Said
(74) Attorney, Agent, or Firm—Robert Buckley

(57) ABSTRACT

An input device for a computer system includes a keyboard, a pointing device embedded in the keyboard, operational buttons, including a button for selecting an operating mode for the pointing device. The mode selection button is located adjacent left- and right-buttons. In one embodiment, an alternative pointing device operating mode is available when the mode button is held depressed. In another embodiment, a depress-release sequence permits the user to sequence through a menu of predetermined pointing device operating modes. The placement of the mode button with respect to the left- and right-buttons facilitates improved performance of certain eye-hand coordination tasks.

10 Claims, 3 Drawing Sheets

US 6,188,390 B1

KEYBOARD HAVING THIRD BUTTON FOR MULTIMODE OPERATION

RELATED APPLICATION

This Application is related to the following co-pending U.S. Patent Applications, all filed on the same date and assigned to the International Business Machines Corporation: "Keyboard Having Buttons Positioned for Operation by Heel of Hand," docket number AM9-97-179 #09/083,680; "Wrist Rest Having Buttons Positioned for Thumbs While Typing," docket number AM9-97-181 #09/083,523; "Two-handed Scrolling Mode Switch," docket number AM9-97-182 #09/083,774.

FIELD OF THE INVENTION

The invention generally relates to information processing systems, and more specifically, to keyboard-related control buttons used with graphical user interfaces to information processing systems. The invention has a particular applicability to IBM® keyboards, computers, and the IBM ThinkPad® notebook computer. (IBM and ThinkPad are registered trademarks of the International Business Machines Corporation.)

BACKGROUND IF THE INVENTION

In general, an input pointing device for a computer graphical user interface ("GUI") has a single assigned function, usually the positioning of a displayed pointer and use of related control buttons for selecting a displayed object pointed to by the pointer.

In some information processing systems it is possible, through the GUI and using the pointer and the control buttons, to alter the cooperation between the manipulation of a pointing device and the displayed pointer. This change is typically accomplished by means of a "settings" window or an appropriate dialog box. For example, it is possible to use a pointing device to change the speed of movement, the size, color, and direction of the displayed pointer, to select a specific displayed icon as the pointer, and whether or not the displayed pointer has a "tail" as it moves. For such changes in the manner in which a pointer responds to manipulation of a pointing device, "settings" windows and dialog boxes have proven quite adequate and will continue to be used.

There are other, newer uses for pointing devices in information processing systems for which it is desirable to both instantaneously and unobtrusively switch from one operating mode to another in a natural and easy way. Such manner of change is not possible with the typical "settings" window or dialog box. Examples of a need for simplicity and naturalness include game playing, document scrolling, and navigation. In such applications a user may need to switch rapidly between standard pointing and a specific different way of having the pointing device manipulation interpreted and displayed. For these newer more demanding applications, "settings" windows and dialog boxes are too slow and seem unnatural.

What is needed is some simple, natural, and easy to operate mechanism for rapidly switching a pointing device between alternative operating modes.

SUMMARY OF THE INVENTION

That need, and others that will become apparent, is met by the present invention which adds a third control button to the standard left- and right-pointer buttons and permits a user to switch between alternative operating modes by simply depressing and releasing the third button. In another embodiment, an alternative mode is selected while the third button is held depressed, the operating mode returning to normal when the third button is released. In yet another embodiment, depressing and releasing the third button selects alternative operating modes in a round-robin sequence of specific modes, ultimately stepping through to the original mode. In a specific embodiment, the control buttons are relocatable, as a group, within a limited range for improved comfort of the user.

BRIEF DESCRIPTION OF THE DRAWINGS

For a further understanding of the objects, features and advantages of the present invention, reference should be had to the following description of the preferred embodiment, taken in conjunction with the accompanying drawing, in which like parts are given like reference numerals and wherein.

DESCRIPTION OF THE PREFERRED EMBODIMENT

Figure 1:
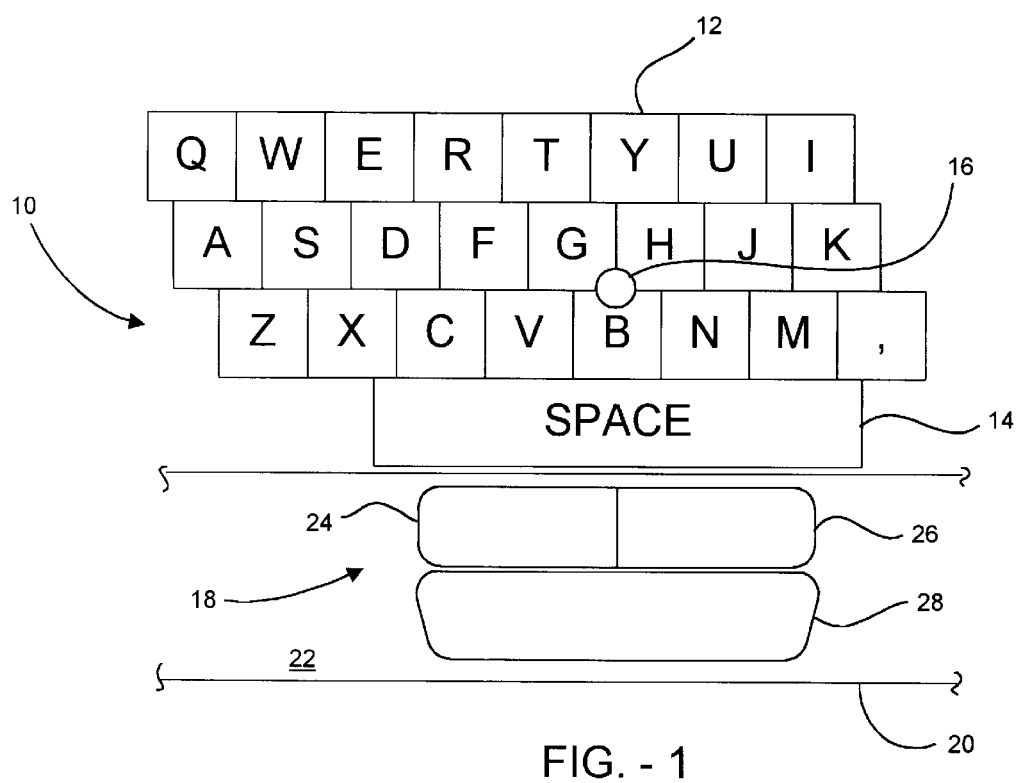
FIG. 1 is a plan view showing a portion of a keyboard including an edge region having a third button for multimode operation.

With reference to FIG. 1 there is shown a plan view of a portion of an information processing system input device, designated generally by the reference numeral 10. The input device 10 includes a keyboard 12, a space bar 14, a pointing device 16, and a plurality of manually operated switches, designated generally by the reference numeral 18. A portion only of the keyboard 12 is illustrated. The pointing device 16 is located within the keyboard near the intersection of the 'G', 'H' and 'B' keys, as is typical in many IBM notebook computers and keyboard input devices.

The input device illustrated in FIG. 1 includes an edge region 20 which has a portion 22 located adjacent the space bar 14. Several manually operated switches 18 are located within the edge region portion 22. In a specific embodiment, the switches 18 include a left-button 24, a right-button 26, and a mode selection button 28.

It is common for IBM notebook computers and keyboard input devices to include left- and right-buttons as illustrated in FIG. 1. These buttons are located side-by-side immediately adjacent the keyboard space bar 14 for ease of use while typing. The left-button 24 and the right-button 26 are used in conjunction with the pointing device 16, and correspond in use to the left- and the right-buttons on a standard two-button mouse pointing device.

In the specific embodiment shown in FIG. 1, a third mode selection button 28 is located immediately below the left-button 24 and the right-button 26. The mode selection button 28 is used to select an operating mode for the pointing device 16 and the left- and the right-buttons, 24 and 26, respectively.

Different Mode While Held Depressed

In a specific embodiment of the invention, the operating mode of the pointing device 16 is in a standard cursor positioning mode when the mode selection button 28 is not depressed. The operating mode changes to an alternative operating mode and remains in the alternative operating mode while the button 28 is held depressed. An example of an alternative mode of operation is a scrolling mode in which a forward pressure on the pointing device 16 causes a currently displayed page to scroll downward on the screen, and a pressure to the left on the pointing device 16 causes the currently displayed page to scroll to the right on the screen. When no pressure is applied to the pointing device 16, the scrolling behavior stops and the displayed page is stationary.

In this specific embodiment, the pointing device provides the scrolling behavior only while the mode selection switch 28 is held depressed. Release of the mode selection switch 28 returns the pointing device to the standard cursor positioning mode.

Depress-Release Selects Different Mode

In another specific embodiment of the invention, the operating mode of the pointing device 16 is switchable between two or more operating modes by depressing and then releasing the mode selection switch 28. Each depress-release sequence of the mode selection switch 28 advances the pointing device operating mode to a next predetermined mode. The operating mode of the pointing device 16 remains unchanged until the mode selection switch 28 is again sequenced through a depress-release cycle. In this manner, the current operating mode of the pointing device may be advanced through a list of available modes, and ultimately returned to the original operating mode.

Examples of such predetermined pointing device operating modes include standard cursor positioning, scrolling behavior, and the positioning of a magnifying glass cursor over a portion of a displayed page document.

Mode Selection Switch Provides Selection Signal

In a specific embodiment of the invention, the manually operated mode selection switch 28 provides a signal permitting a component of the information processing system to determine the operating mode of the pointing device 16. In yet another specific embodiment of the invention, the pointing device 16 is an IBM TrackPoint® isometric pointing device which includes circuits for combining signals provided by manually operated switches with pointing signals for providing these signals to an information processing system (TrackPoint is a registered trademark of the International Business Machines Corporation).

In another specific embodiment, the pointing signals, the switch signals, and signals provided by the keyboard 12 are combined to provide a standardized interface signal to the information processing system.

In yet another specific embodiment, the left-, right- and pointer mode-selection switches define a control button group, and the control button group is relocatable, within a limited range of movement in both the horizontal and the vertical directions. This feature permits a user to adjust the location of the button group for maximum comfort and decreased user stress.

Stand-alone Wrist Rest Configuration

Figure 2:
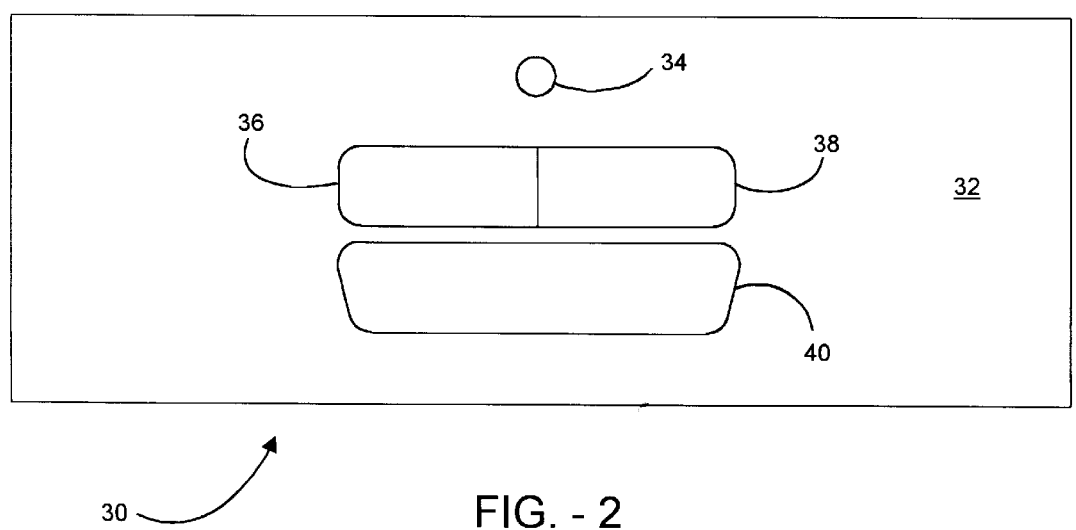
FIG. 2 is a plan view of a wrist rest including a pointing device, selection buttons and a third button for multimode operation.

FIG. 2 is a plan view which illustrates an information processing system input device, designated generally by the reference numeral 30.

The input device 30 includes a wrist rest 32, a pointing device 34, a left-button 36, a right-button 38, and a mode selection button 40. The mode selection button 40 provides a signal for selecting an operating mode for the pointing device 34, as described above with respect to FIG. 1.

The input device shown in FIG. 2 is useful with a computer which does not provide a pointing device within its keyboard. The input device 30 is therefore useful in place of a stand-alone pointing device such as a standard mouse or joystick. The left-button 36 corresponds to the left-button of the standard two-button mouse, while the right-button 38 corresponds to the right-button of the standard two-button mouse.

In a specific embodiment, the input device 30 includes a circuit for combining signals provided by the pointing device 34, the left-button 36, the right-button 38, and the mode selection button 40 into an industry standard interface, such as the PS/2 interface.

Conforming Front-operable Buttons

Figure 3:
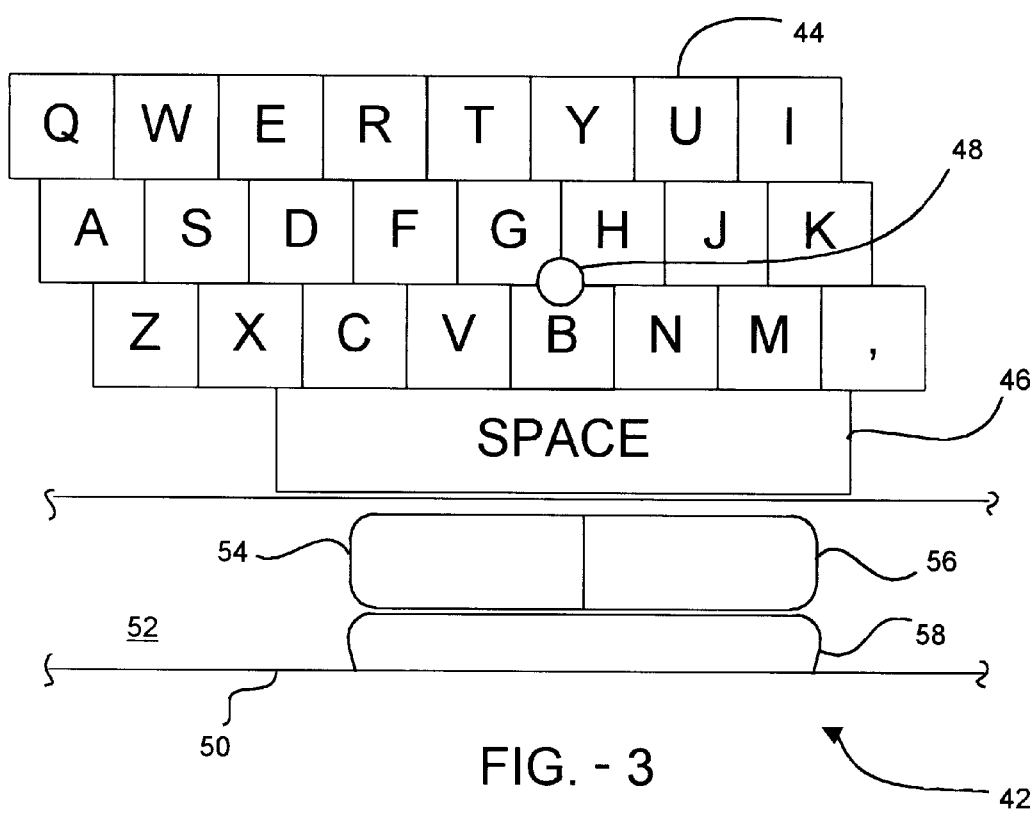
FIG. 3 is another plan view showing a portion of a keyboard including an alternative edge region having a third button for multimode operation.

FIG. 3 is a partial plan view illustrating a computer input device, designated generally by the reference numeral 42. The input device 42 includes a keyboard 44, a space bar 46, a pointing device 48, a keyboard edge region 50, a portion 52 of the edge region, a left-button 54, a right-button 56, and a mode selection button 58. The view illustrated by FIG. 3 is essentially the same as that shown in FIG. 1, except that the edge region portion curves downward and the surfaces of the buttons 54–58 conform with the curvature of the edge region.

Figure 4:
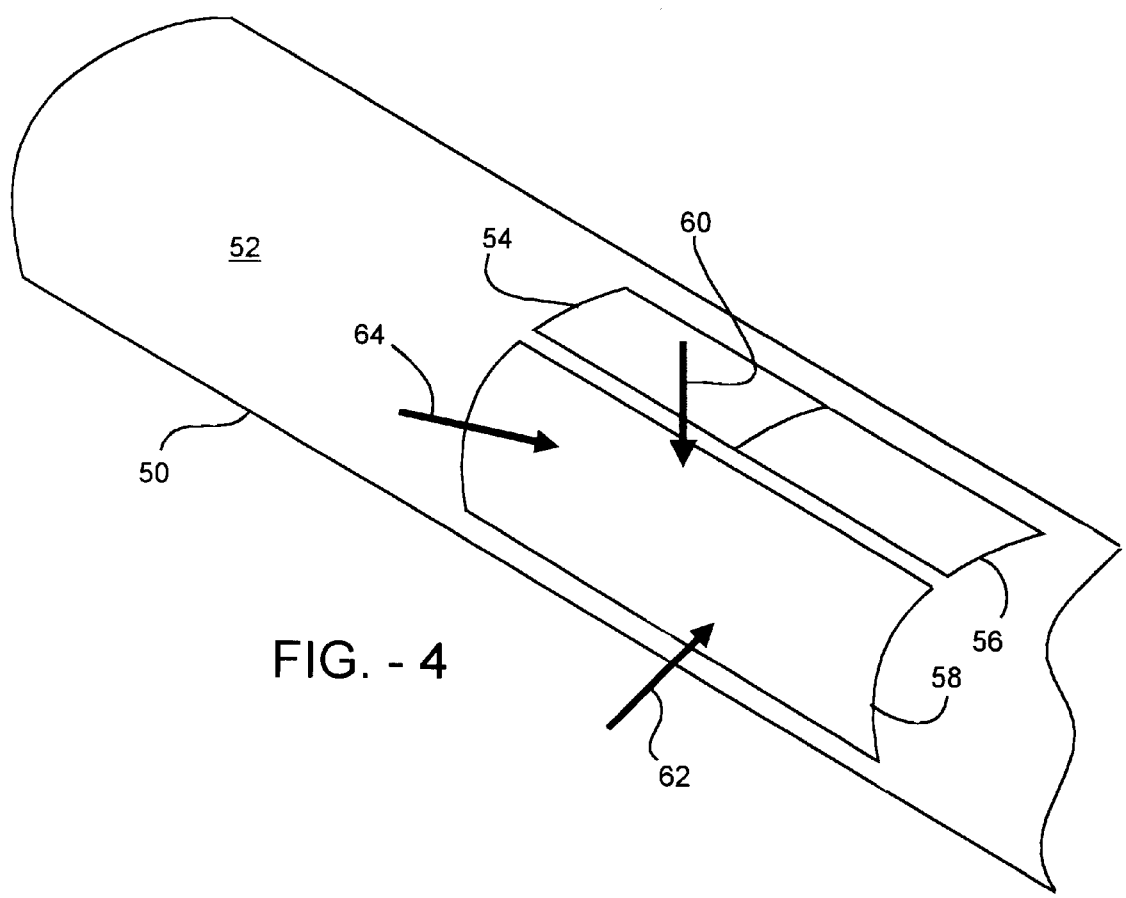
FIG. 4 is a partial perspective view of the alternative keyboard edge region and buttons shown in FIG. 3.

This detail is more readily seen in a partial perspective view provided by FIG. 4, in which like elements are shown with reference numerals identical to those of FIG. 3. FIG. 4 illustrates a portion 52 of the edge region 50 and the buttons 54–58. Each button has an operating surface which conforms with the curvature of the portion 52. The button 58 is operable by pressing it from the top (arrow 60), from the front (arrow 62), or obliquely (arrow 64). This feature of the button 58 permits a user to press with a thumb while typing or while using the pointing device 48 (FIG. 3) without regard to the direction the thumb is pressing, either downward, toward the front, or from an oblique side angle. This feature improves the ease of operation of the mode selection button 58.

Separate Keyboard Configuration

Figure 5:
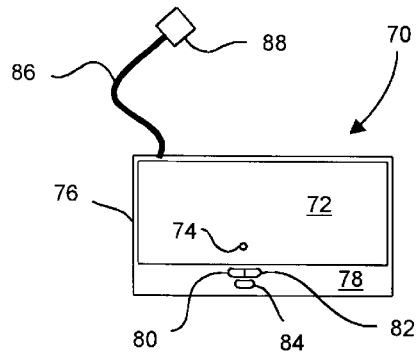
FIG. 5 is a schematic plan view of a computer input device having a cable and connector for making connection to an information processing system.

FIG. 5 is a schematic plan view of a computer input device having a cable and connector for making connection to an information processing system. The computer input device is designated generally by the reference numeral 70 and includes a keyboard 72, an isometric pointing device 74, a surrounding keyboard edge region having a portion 78 which is wider and which includes a left-control button 80, a right-control button 82, and a pointer mode selection button 84. The input device 70 includes a circuit (not shown)

for combining and processing signals from the keyboard 72, the pointing device 74, the control buttons 80, 82, and the mode selection button 84. The combined and processed signals are encoded into an industry-standard output signal, such as the PS/2 signal. Electrical connection is made between the input device 70 and a computer or other information processing system via a cable 86 and connector 88. The input device 70 represents a specific embodiment of the present invention.

Notebook Computer Configuration

Figure 6:
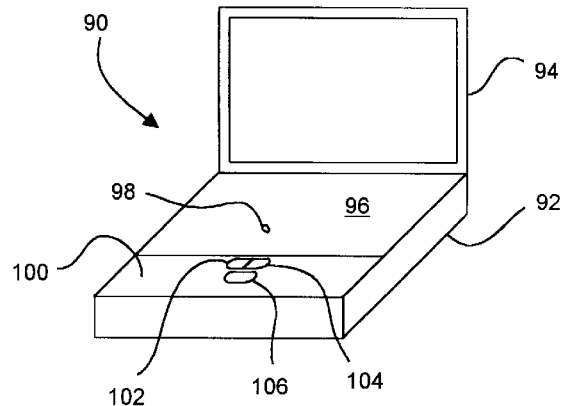
FIG. 6 is a perspective view of a notebook computer illustrating a wrist rest area having left- and right-control buttons and a pointer mode selection button.

FIG. 6 is a perspective view of a notebook computer illustrating a wrist rest area having left- and right-control buttons and a pointer mode selection button. The notebook computer is designated generally by the reference numeral 90 and includes a body 92 and a flat-panel display screen 94. The body 92 includes a keyboard 96, an isometric pointing device 98, and a wrist rest region 100. The wrist rest region 100 includes a left-control button 102, a right-control button 104, and a pointer mode selection button 106. The control buttons 102, 104 and the mode selection button 106 are located on the wrist rest region 100 adjacent to a keyboard space bar (not shown) and the isometric pointing device. The buttons 102–106 are located for easy and natural use while typing and while manipulating the finger-tip control isometric pointing device 98. In a specific embodiment, the pointing device 98 is an IBM TrackPoint pointing device.

A Standard Encoded Output Signal

Figure 7:
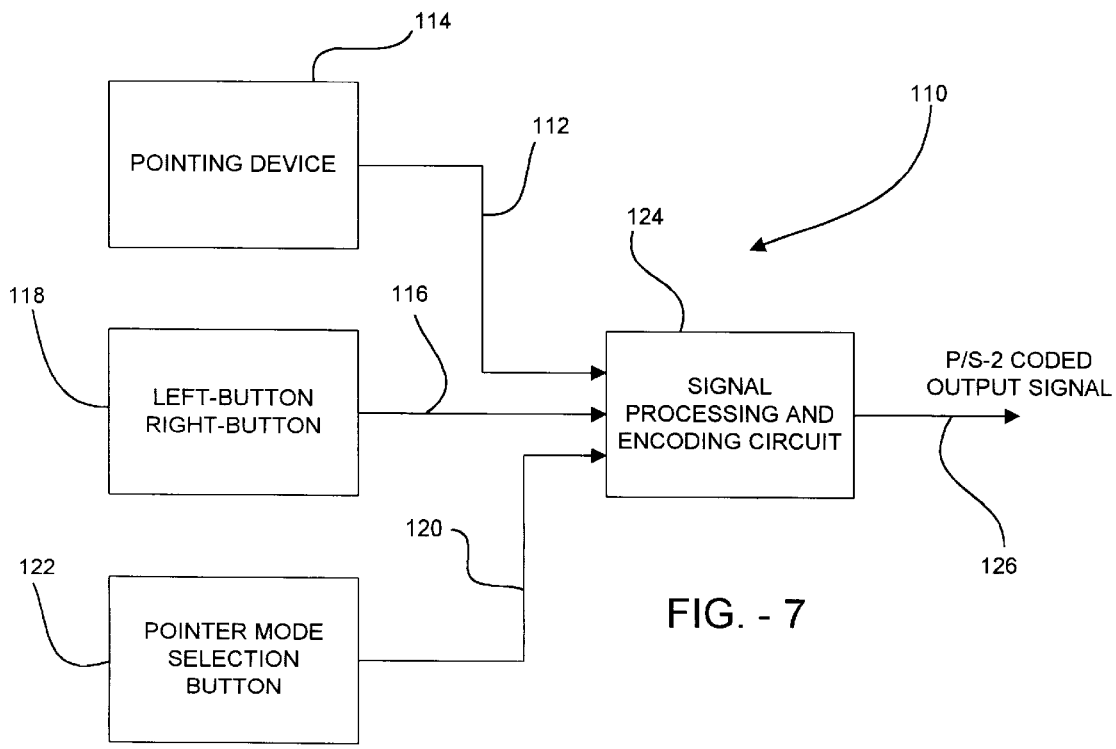
FIG. 7 is a block diagram which illustrates a circuit for combining output signals from a pointing device, control buttons, and a pointer mode selection button and for processing and encoding these signals into an industry-standard encoded output signal.

FIG. 7 is a block diagram which illustrates a circuit for combining output signals from a pointing device, control buttons, and a pointer mode selection button and for processing and encoding these signals into an industry-standard encoded pointer output signal. The circuit is designated generally by the reference numeral 110. The circuit 110 includes a first input line 112 for receiving an output signal of a pointing device 114, a second input line 116 for receiving an output signal from a left-control button and a right-control button 118, and a third input signal 120 for receiving an output signal from a pointer mode selection button 122. The circuit includes a portion 124 which combines and processes the received output signals and encodes these into an industry-standard pointer output signal 126, such as the PS/2 signal. In a specific embodiment, the pointer mode selection button 122 controls an encoded field (not shown) within the encoded output signal 126. The encoded field defines a mode selection command.

While the invention has been described in relation to the embodiments shown in the accompanying Drawing figures, other embodiments, alternatives and modifications will be apparent to those skilled in the art. It is intended that the Specification be exemplary only, and that the true scope and spirit of the invention be indicated by the following Claims.

What is claimed is:

1. An information processing system input device, comprising:
    a keyboard including a space bar;
    a pointing device disposed among keys of the keyboard;
    a keyboard edge region having a portion adjacent the keyboard space bar, said portion forming a surface that curves downward away from the plane of the keyboard;
    a plurality of manually operated switches disposed within the edge region portion, and having operating surfaces conforming essentially with said edge region portion surface;
    one of the manually operated switches providing a signal for selecting an operational mode of the pointing device; and
    means for electrically connecting the keyboard, the pointing device, the manually operated switches, and the operational mode selection signal to an information processing system.

2. The input device as set forth in claim 1, wherein the edge region forms a border surrounding the keyboard.

3. The input device as set forth in claim 1, wherein there are three manually operated switches.

4. The input device as set forth in claim 3, wherein the three manually operated switches are, respectively, a left selection switch, a right selection switch, and the pointing device operational mode selection switch.

5. The input device as set forth in claim 4, wherein the left selection switch and the right selection switch are located between the keyboard space bar and the pointing device operational mode selection switch.

6. The input device as set forth in claim 1, wherein the manually operated switches are located in close proximity of each other for ease of use while typing.

7. The input device as set forth in claim 1, wherein the pointing device is an isometric device.

8. The input device as set forth in claim 1, wherein the manually operated switches are relocatable, within a limited range of horizontal movement.

9. The input device as set forth in claim 1, wherein the manually operated switches define a control button group, and the group is relocatable, within a limited range of both horizontal and vertical movement.

10. A computer input device, comprising:
    a keyboard including a space bar;
    an isometric pointing device located among keys of the keyboard;
    a left-control button;
    a right-control button;
    a pointing device mode selection button;
    a keyboard edge region having a portion adjacent the keyboard space bar;
    said edge region forming a surface that curves downward away from the plane of the keyboard;
    the control buttons being located within said curved edge region portion, and having operating surfaces conforming essentially with said curved surface;
    the mode selection button being located adjacent the control buttons for ease of use by the thumbs while typing;
    a circuit for receiving electrical output signals of the pointing device, the control buttons and the mode selection buttons, for combining the electrical output signals and forming a coded P/S-2 output signal for connection to a computer or other information processing system; and the coded P/S-2 output signal including a control field defining a pointing device mode selection command.

* * * * *